June 1, 1965          L. H. LAMONT          3,186,508

EMERGENCY CONTROL FOR A VEHICLE

Filed March 6, 1963          3 Sheets-Sheet 1

INVENTOR.

Lewis H. Lamont

BY

Hill, Sherman, Meroni, Gross & Simpson

ATTORNEYS

June 1, 1965 L. H. LAMONT 3,186,508
EMERGENCY CONTROL FOR A VEHICLE
Filed March 6, 1963 3 Sheets-Sheet 2
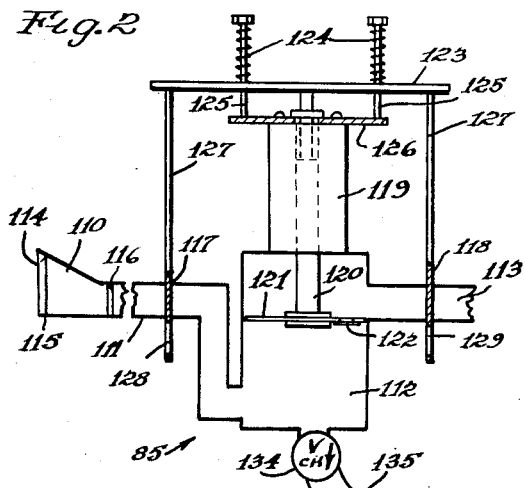
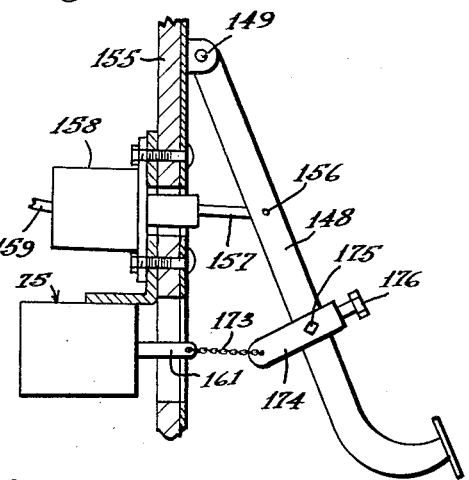
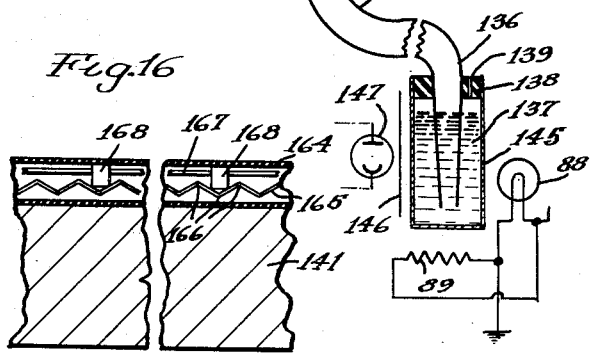
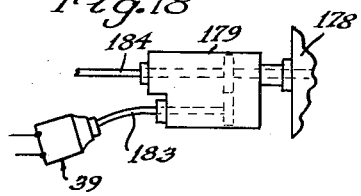
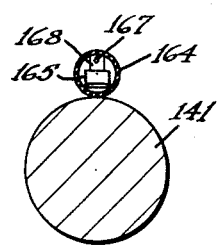
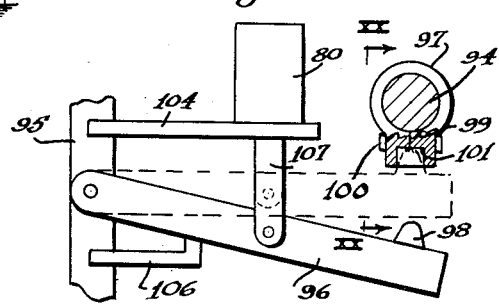
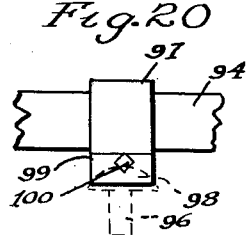
INVENTOR.
Lewis H. Lamont
BY
Hill, Sherman, Meroni, Gross & Simpson
ATTORNEYS

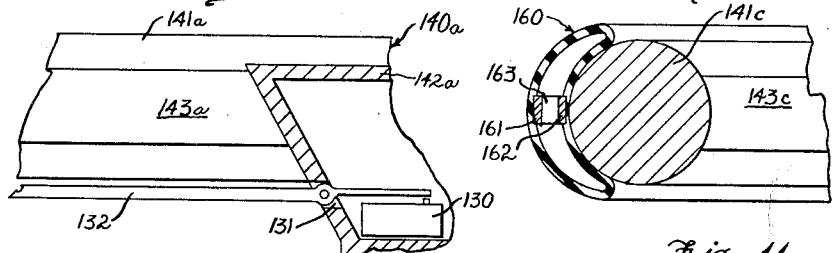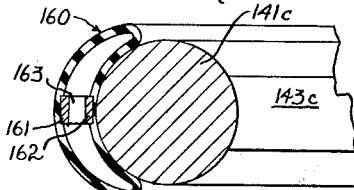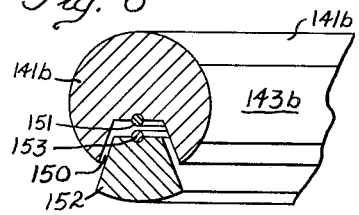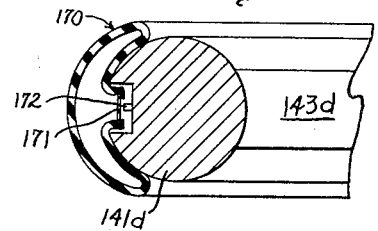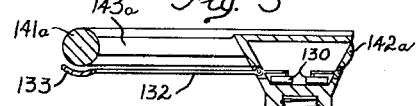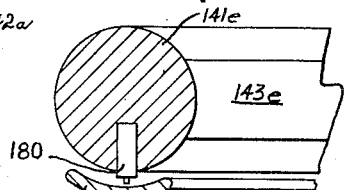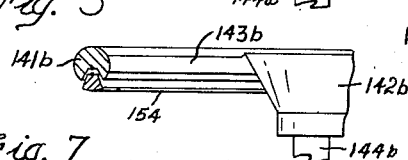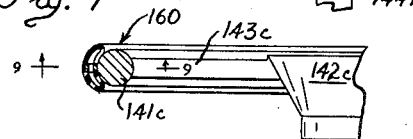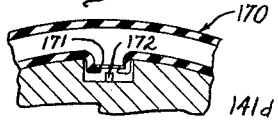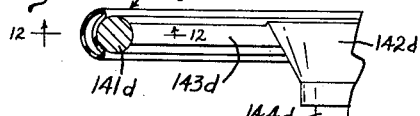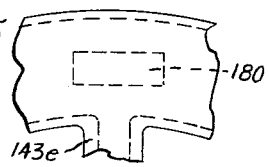
INVENTOR.
Lewis H. Lamont
BY Fred Wells
atty.

United States Patent Office 3,186,508
Patented June 1, 1965

3,186,508
EMERGENCY CONTROL FOR A VEHICLE
Lewis H. Lamont, 4750 N. Lotus Ave., Chicago, Ill.
Filed Mar. 6, 1963, Ser. No. 264,478
17 Claims. (Cl. 180—82)

This invention relates generally to emergency controls for a vehicle, and more specifically to an emergency control system embodying several novel features and results.

This application is a continuation-in-part application of my prior U.S. application, Serial No. 56,553, filed September 16, 1960, abandoned with the filing of this application, and which prior application is a continuation-in-part application of my earlier filed application, U.S. Serial No. 841,376, filed September 21, 1959, now abandoned.

Although the principles of the present invention may be included in various vehicles, a particularly useful application is made when the same is provided as a control system for an automobile or truck.

In today's high speed driving, it is a rather common occurrence for an automobile to go out of control, with resulting loss of life and damage to property, due to failure of the driver to maintain proper control of the vehicle, where such failure is due to drowsiness, influence of alcohol or drugs, sickness, or death. Various systems have been previously proposed by others for the purpose of sensing such conditions and bringing about corrective action. Such systems have had various disadvantages, it being a primary object of this invention to provide an emergency control system for a vehicle which avoids such disadvantages.

By way of example, prior systems have required continual alertness under conditions which do not need the same, and when evidence of lack of such alertness has been sensed, the system has gone into its emergency condition or state. If the vehicle engine is idling for warm-up, tune-up, stop-sign change, or the like, there is no need for an emergency control system. So also when a motorist is inching along in a traffic jam, parking his car, or moving at a very slow rate for any other purpose, there is no need for operation of emergency controls. It is entirely unsatisfactory for such a system to be provided with manual disabling means, such as an on-off switch that the motorist can use under those conditions, since such a switch provides a temptation to leave the same off when it is needed, and may be forgotten in an "off" position. Accordingly, it is a further object of the present invention to provide an emergency control system for a vehicle which is automatically inoperable until the vehicle speed has increased to a predetermined minimum.

Once a speed-responsive system has sensed a speed above the minimum and has sensed an emergency condition, it is undesirable that a subsequent speed decrease should disable or inactivate the system. Accordingly, a further object of the present invention is to provide a system which, when in an emergency condition, will remain so even though vehicle speed be reduced below the predetermined minimum.

In prior systems, there is a state, status, or operational sequence of steps which must be continually maintained to prevent the system from going into its emergency condition. For example, if the system employs grip-sensing means, a mere change of grip by the motorist has placed the system in emergency condition. If a system has been sensitive to small angular steering wheel movements, steady steering could and has tripped such system. Thus it is a further object of the present invention to provide an emergency control system which will ignore transient conditions of apparent emergency.

In certain prior systems, means have been provided to interrupt the ignition circuit as one of the remedying or safety means. The provision of contacts in series with the ignition circuit inherently adds a further point requiring maintenance, and comprises a point of possible malfunction in ordinary operation. Accordingly, it is an object of the present invention to provide an emergency control for a vehicle wherein one of the electrically actuated remedying or safety means includes ignition control without inclusion of any contact in series with the ignition circuit.

Yet another object of the present invention is to provide means by which a motorist, who is following, can be warned of an impending emergency condition by energizing the brake lights of the vehicle without energizing the brakes thereof. Yet another object of the present invention is to provide means by which the brake lights of the vehicle are energized for a predetermined period prior to the time that brakes are automatically applied.

A still further object of the present invention is to provide means by which dual tail lights are energized and are simultaneously flashed at a time that the brakes are not being applied.

Another object of the present invention is to provide means by which brakes are automatically applied when an apparently serious condition is present, and are maintained energized even though such apparently serious condition has been removed.

A still further object of the present invention is to provide means by which brakes are automatically energized for a period of time sufficient to stop the vehicle, such brakes being thereafter automatically deenergized, even when the emergency condition is still existing. Another object of the present invention is to provide means by which the vehicle brakes and a further remedying device are automatically energized, and by which the brake-energizing means are thereafter deenergized after the vehicle has come to a stop, with the other electrical remedying means left in operation.

A further object of the present invention is to provide an emergency control system for a vehicle wherein brakes are automatically energized together with means for locking the direction in which the vehicle is headed.

Prior systems have indirectly sensed whether the driver of the vehicle is under the influence of alcohol, relying on such symptoms such as release of grip, bobbing head, and the like. It is a primary object of the present invention to provide an emergency control for a vehicle which control actually is responsive to the alcoholic content in the blood stream of the driver.

A further object of this invention is to provide means which is responsive to an alcoholic breath and which controls electrically actuated remedying means.

A further object of the present invention is to provide means by which the breath of the driver is analyzed for alcohol just as the driver is about to put the vehicle into motion.

A still further object of the present invention is to provide means for sampling the breath of the driver after a few moments of delay to insure that the breath sample is representative.

Yet another object of the present invention is to provide alcoholic-breath responsive means which energizes remedying circuits in a manner that they cannot be deenergized by subsequent normal driver movements.

A still further object of the present invention is to provide alcoholic-breath responsive means which are automatically deenergized after the sampling and analysis has taken place.

Yet another object of the present invention is to provide alcoholic-breath responsive means in conjunction with a system which is normally inoperative below a predetermined speed, but wherein the alcoholic-breath responsive means will operate and will perform its function at any speed below said predetermined speed.

Another object of the present invention is to provide improved grip sensing means. Yet another object of the present invention is to provide means by which other motorists are advised that the vehicle is equipped with emergency controls of the type described, that they are energized, and that the condition of the driver is satisfactory. Another important object of the present invention is to provide emergency control systems for vehicles which meet any combination of the foregoing objects.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 2 is a schematic diagram of alcoholic breath sampling and analysis structure employed with the circuit diagram of FIGURE 1;

FIGURE 3 is a partial cross section of a modified steering wheel showing one embodiment of my control switch mounted thereon;

FIGURE 4 is an enlarged view of the right hand portion of FIGURE 3;

FIGURES 5, 7, 10 and 13 are similar to FIGURE 3, but each illustrates another form of my control switch;

Figure 1:
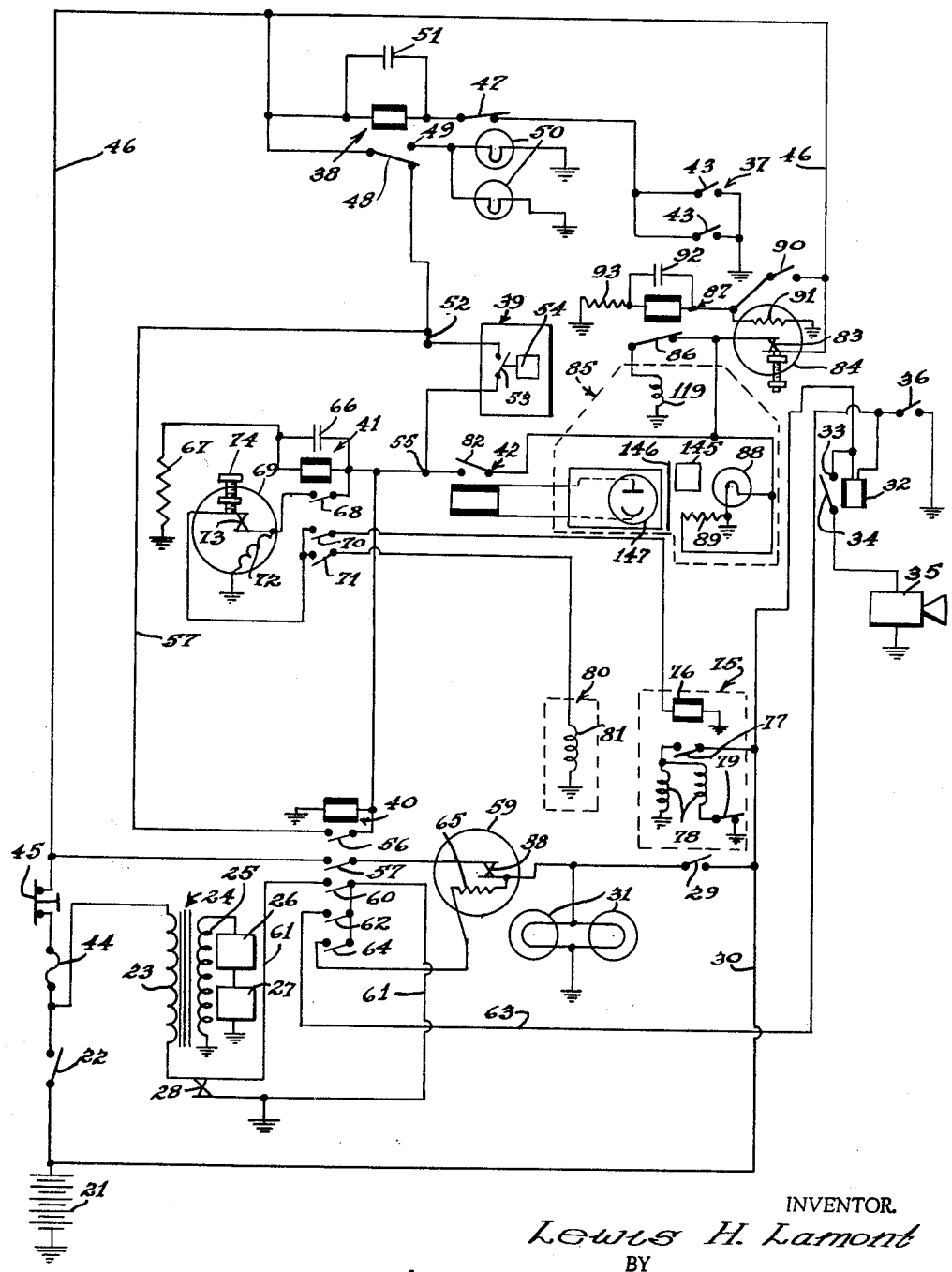
FIGURE 1 is a schematic diagram of an emergency control system for a vehicle equipped with features provided in accordance with the principles of the present invention.

FIGURES 6, 8, 11, and 14 show enlarged cross sections of the steering wheel rims shown in FIGURES 5, 7, 10, and 13 respectively;

FIGURES 9, 12, and 15 show enlarged partial sectional views taken along line 9—9, 12—12, and 15—15 in FIGURES 7, 10, and 13 respectively;

FIGURE 16 is a longitudinal cross section of a further control switch or grip sensing device, the same being shown in cross section as installed on a steering wheel in FIGURE 16a;

FIGURE 17 is a diagram of a brake pedal equipped with actuating means;

FIGURE 18 is a diagrammatic illustration of minimum-speed sensing means;

FIGURE 19 is a schematic view of a steering linkage control; and

FIGURE 20 is a partial sectional view taken along line XX—XX of FIGURE 19.

As shown on the drawings:

The principles of this invention are particularly useful when embodied in an emergency control system for a vehicle such as is illustrated schematically in FIGURE 1.

The control system has been illustrated in conjunction with various components of a vehicle, such as an automobile. The vehicle is conventional and includes a grounded power supply 21 having an ignition switch 22 connected to bring power to a primary winding 23 of an ignition coil generally indicated at 24. The ignition coil 24 includes a secondary winding 25, one side of which is grounded, and the other side of which leads to a distributor 26 which is connected by a number of leads to a group of spark plugs collectively indicated at 27, and which are grounded. The primary winding of the ignition coil 24 is connected to one of a pair of breaker or contact points 28, the other of which is grounded. The vehicle includes a manual control such as a steering wheel, fragmentarily illustrated in other figures, and a brake pedal, also described later herein. The brake pedal controls a pedal-operated switch 29, one side of which is connected to a power lead 30, which is connected to the power supply 21, and the other side of the brake pedal switch 29 is connected to a pair of conventional rear or tail brake lights 31, 31. The power line 30 is also connected to one side of the coil of a horn relay 32 and to one of the contacts 33 of the horn relay 32. The other of the contacts 34 of the horn relay 32 is connected to the vehicle horn or horns 35. The other side of the coil of the relay 32 is connected through a horn button switch 36 to ground.

The portions 21–36 of the vehicle thus far described are conventional, as are also the connections between them. It is pointed out that the system described hereafter can be connected to such conventional vehicle components without any alteration or opening of such conventional circuits.

Reference is made hereafter to electrically actuated remedying or safety device or devices. Such terminology encompasses any signalling means, such as of the audio type, for example the horn 35, such as of the visual type, for example the brake lights, 31, any other electrically operated signalling means, as well as certain further electrically actuated remedying or safety devices described and more specifically identified later herein. Thus, warning and emergency controls or devices may be added to or subtracted from, or substituted for those in the preferred disclosed embodiment.

The emergency control system includes condition-responsive switch means generally indicated at 37 for controlling a sensing-circuit relay 38 which delivers power under the control of a speed-responsive switch 39 to the coil of a warning relay 40 and to the coil of an emergency relay 41, the relays 40 and 41 being each connected to operate appropriate warning and emergency remedying or safety devices.

The disclosed system further includes an alcohol-control relay 42 operative, when actuated, to bring power from the power supply 21 to the coils of the warning and emergency relays 40, 41, irrespective of the position of the condition-responsive switch means 37, the sensing-circuit relay 38, or the speed-responsive switch 39.

The names given to relays herein have been assigned for purposes of identification and not limitation, and it is to be understood that whenever it is more practicable to do so, a relay-operated relay may be substituted for any relay disclosed herein without departing from the scope of the terminology intended by the use of the word "relay" herein.

The condition-responsive switch means 37 here comprises means which are responsive to any proper driving condition, and have been illustrated as comprising a number of pairs of normally open switch contacts 43, 43, connected in parallel. When the sensed driver condition is desirable, one of the pairs of contacts 43 of the switch means 37 is closed. When the sensed driver condition is undesirable, dangerous, or indicative of an emergency, all of the contacts 43 are open. Specific examples of structure which may be utilized as the switch means 37 are shown in FIGURES 3–16a, and are described later herein.

The sensing-circuit relay includes a coil which is energized as soon as both the ignition switch 22 and the condition-responsive switch means 37 are closed. To this end, power passes from the ignition switch 22 through a fuse 44, a normally closed manual switch 45, a switch-controlled power line 46, through the coil of the relay 38, through a pair of normally closed relay contacts 47 under the control of the emergency relay 41, and through the condition-responsive switch means 37 to ground. As soon as current begins to flow through the coil of the sensing-circuit relay 38, the armature thereof moves instantly to open a pair of normally closed contacts 48 which are thus responsive to such coil, and to close a pair of normally open contacts 49, thereby completing a circuit from the switch-operated power line 46, through the now-closed normally open relay contacts 49, and through a pair of signalling means 50, 50 to ground. Thus, after the ignition switch 22 is closed, and after the condition-responsive switch means 37 indicate that all is in order, the sensing-circuit relay 38 energizes the electrical signalling means 50. One of the signalling means 50 comprises a lamp disposed within the vehicle within the convenient view of the driver. This signal means indicates to the driver that the emergency control system is energized, and that it is not then in a warning or emergency state as is explained below. The other signalling means 50 may comprise a light or an electrically operated signal flag which is disposed to be seen from other vehicles. The externally observable signalling means 50 thus indicates to other motorists that the vehicle having the same is equipped with an emergency control system, and when such light or other signal is energized, that such system is energized and is not in a warning or emergency condition.

The coil of the sensing-circuit relay 38 is maintained in a continuously energized condition under the control of the condition-responsive switch means 37. However, if at any time the circuit through the switch means 37 is momentarily broken, the condition-responsive switch means 37 will not react thereto. To this end, there is provided means 51 on the coil of the sensing-circuit relay 38 which hold the normally closed contacts 48 open for a time delay. The means 51 comprise a capacitor which discharges through the coil of the sensing-circuit relay 38 when the coil current is interrupted. The period of discharge may be from one and one-half to two seconds, the same being a period of delay for the relay to drop out when deenergized. However, the capacitor 51 does not delay the action of the relay when the circuit is initially closed or reclosed. This short period of delay is particularly advantageous in that momentary interruptions of current flow therethrough produce no effect on the warning relay 40 or emergency relay 41. Thus, if the condition-responsive switch means 37 comprises a grip-operated switch on the steering wheel, the driver may change his grip from time to time as he may choose without setting off any of the electrically activated remedying or safety devices. However, if the grip is relaxed for a period of time longer than the short duration permitted by the sensing-circuit relay 38, or if any other condition which is sensed by the means 37 continues for a period of time longer than that permitted by the sensing-circuit relay 38, the armature thereof will move to the deenergized illustrated position, thereby reclosing the normally closed contacts 48 to bring power to a terminal 52.

The speed-responsive switch 39 includes a pair of normally open contacts 53 which are under the physical control of a mechanism 54 responsive to the speed of the vehicle. The mechanism 54 is described further below and preferably is operative to close the normally open contacts 53 whenever the vehicle speed exceeds a predetermined or preset speed, such as 15 m.p.h. Thus, when power is brought through the normally closed contacts 48 to the terminal 52, nothing will happen unless the speed of the vehicle is then exceeding the preset minimum, such as 15 m.p.h. If the speed is then above the preset minimum, the power is brought to a terminal 55 which is connected to the coils of the warning relay 40 and the emergency relay 41.

The provision of the speed-responsive switch 39 enables the driver to idle the engine or tune-up, warm-up, stop-sign change or the like in a more relaxed manner without any electrically actuated remedying or safety device becoming energized. Thus, also the system does not require the driver to maintain an unnecessary degree of alertness when he is inching along in a traffic jam or moving very slowly for other reasons. However, as is explained below, opening of the contacts 53 of the speed-responsive switch 39, due to reduced vehicle speed while the system is in a warning or emergency condition, has no effect on the system.

When the warning relay 40 is closed in response to the joint action of the normally closed contacts 48 of the sensing-circuit relay 38, and the normally open contacts 53 of the speed-responsive switch 39, a number of electrically actuated remedying or safety devices of the warning type are immediately energized. To this end, the warning relay 40 includes five pair of normally open contacts. The uppermost pair of contacts 56 illustrated, serves on being closed to close a holding circuit 57 which acts in the nature of a shunt across the terminals 52 and 55 so that a subsequent reduction in vehicle speed which opens the speed-responsive switch contacts 53 will not effect a deenergizing of the warning relay 40. The second pair of normally open contacts 57 of the warning relay 40 is connected to close a circuit from the switch-operated power line 46, through normally closed contacts 58 of a flasher switch 59 to the brake lights 31. By this feature, power is applied to the brake lights 31 even though the brake light switch 29 has not been closed and the brake pedal has not been depressed and the brakes have not been applied. This warns any motorist who is following of a possible emergency condition ahead of him. It also warns him that the vehicle is slowing down in the following manner.

The third pair of the normally open contacts 60 of the warning relay 40 is also an electrically actuated remedying device and is connected across the ignition contact points 28 in the nature of a shunt 61, thereby terminating induction of the spark potential in the ignition coil 24 when the contacts 60 are closed. Such shunting kills the engine which then serves as a brake on the driven wheels to reduce vehicle speed.

In the event that the condition sensed by the condition-responsive switch means 37 is promptly removed after the warning relay 40 has been energized, such change in condition will effect immediate operation of the sensing-circuit relay 38, and thus also a reopening of all of the contacts of the warning relay 40. Thus, the relay 40 will open the shunt circuit 61 across the ignition coil contacts 28, thus enabling the kinetic energy of the vehicle acting through the driven wheels thereof to drive and thus to restart the engine.

The fourth set of normally open contacts 62 of the warning relay 40 is connected between ground and one side of the coil of the horn relay 32 through a line 63. Thus, the contacts 62 are connected in parallel with the horn switch 36. Closing of the warning relay 40 thus effects continual energization of the horn 35, thereby warning the driver, his passengers, and any pedestrians or other motorists hearing the same of an emergency condition.

The fifth pair of normally open contacts 64 of the warning relay 40 is connected between ground and one side of a heater element 65 in the flasher 59, the other side of the heater element 65 being connected to the switch-operated power line 46 through the normally closed flasher contacts 58 and the normally open warning relay contacts 57. After the brake lights 31 have been energized by the warning relay 40 for a few moments, sufficient heat is built up in the heater 65 to actuate a bimetal that opens the contacts 58, thereby terminating current flow to both the brake lights 31 and the heater element 65. Cooling of the heated bimetal then recloses the contacts 58 to repeat the cycle, whereby the flasher 59 effects simultaneous flashing of both of the brake lights 31.

Whenever a potential is applied to the coil of the warning relay 40, a like potential is applied to the coil of the emergency relay 41. However, the emergency relay 41 does not immediately close. To this end, there is provided means 66 in the form of a capacitor connected across the coil of the emergency relay 41 and a resistor 67 connected between one end of the coil and ground, such means being operative to delay closing of the relay 41 for a predetermined time after the potential has been applied thereto. The delay means 66, 67 thus works oppositely from the delay means 51, the delay means 66, 67 being operative to enable immediate reopening of the emergency relay 41 as soon as the potential thereto has been removed. Values are preferably selected for the capacitor 66 and resistor 67 which will produce a closing delay period of about one and one-half or two seconds, thereby giving the driver up to that much time when he has been alerted by the electrically actuated remedying devices controlled by the warning relay 40 or by the extinguishing of one of the signalling means 50, during which time he must take appropriate corrective action, depending upon the nature of the condition-responsive switch means 37. If he fails to do so within that time, the emergency relay 41 will close or operate and attain the following results.

The emergency relay 41 has three pair of normally open contacts and one pair of normally closed contacts. The first pair of normally open contacts 68, when closed, brings power from the after-governor terminal 55 through a thermal time delay switch 69 to the other pairs of normally open contacts 70 and 71. The thermal time delay switch 69 includes a heater 72 which receives power from the contacts 68 when they are closed, the other side of the heater 72 being grounded. Power from the contacts 68 also flows through a pair of normally closed switch contacts 73 to the contact pairs 70 and 71. The thermal switch 69 includes adjustment means 74 by which the amount of bias on the contacts 73 may be adjusted, whereby the amount of time necessary for the heater 72 to open the same may be varied. It will be noted that once the contacts 73 open, they do not interrupt current through the heater 72, so that they remain open.

The second pair of normally open contacts 70 of the emergency relay 41 is connected to an electric actuator generally indicated at 75 for the brake pedal. In this embodiment, the actuator 75 includes a brake relay 76 having a coil connected to the contacts 70, the other side of the coil being grounded. The brake relay 76 further includes a pair of normally open contacts 77, one of which is connected to the power line 30, and the other of which is connected to the windings of a two-winding solenoid 78. One of the windings is grounded directly and the other of the solenoid windings is grounded through a normally open switch 79 which opens in response to solenoid movement. Thus, the winding having the switch 79 in series with it is a high-current intermittent duty winding, whereas the other winding is capable of holding the solenoid plunger in the energized position for a longer period of time drawing less current and creating less heat. The structural details of such a solenoid and switch 78, 79 are known in the art.

The third pair of normally open contacts 71 of the emergency relay 41 bring power to a solenoid 80 having a grounded winding 81, the solenoid 80 being employed to lock the steering control mechanism, the structural details of which are described later herein.

The fourth pair of contacts of the emergency relay 41 are normally closed and have been described above as being the contacts 47 in series with the coil of the sensing-circuit relay 38.

The contacts 73 of the time delay switch 69 are in series circuit with the brake actuator 75 and in like circuit with the electric actuator 80 for the steering control mechanism. The contacts 73 are preferably set by the means 74 to remain closed for a period of time necessary to insure that the vehicle has been brought to a stop by application of the electric actuator 75 for the brake pedal. Once the brakes have halted the vehicle, an unnecessary subsequent current drain, and possible overheating of solenoids is avoided by the opening of the thermal time delay switch 69. A typical time delay that the switch is set to is 30 seconds. Thus, although the brakes, and steering lock, if used, have been deenergized at the end of the predetermined preset time period, the emergency relay 41 is still closed whereby the normally closed contacts 47 are held open, serving as a lock-out for the sensing-circuit relay 38. This prevents subsequent reclosing of the condition-responsive switch means 37 from placing the control system back into a normal drive condition. Once the emergency relay 41 has closed, an alert operator can manually momentarily open the switch 45 if he has the mental and physical ability to do so, it being disposed preferably at an inconvenient but reachable position. Opening of the switch 45 will immediately reopen both the warning relay 40 and the emergency relay 41, and on its being reclosed, the emergency control system is back in normal condition. A stranger coming to the rescue of the stopped car may not be expected to know of the location of the switch 45. However, as soon as the ignition switch 22 is turned off, the system is completely shut down, the engine having been previously killed. In the event that the driver should inadvertently delay too long when he is initially warned, the emergency relay 41 will close, set the brakes, and lock out the sensing circuit. However, an alert driver will be able promptly to reach the awkwardly located manual switch 45 to momentarily operate the same. If the sensing switch 37 is then closed, the control system is back in the normal non-warning, non-emergency state that it was a few moments earlier.

The alcohol control relay 42 includes a pair of normally open contacts 82, one of which is connected to the after-governor terminal 55, and the other one of which is connected through the contacts 83 of a thermal time delay switch 84 to the switch-operated power line 46. Whenever the contacts 82 close, regardless of the condition of the condition-responsive switch means 37, and regardless of the speed of the vehicle, the warning relay 40 and the emergency relay 41 are energized, and close in sequence as described. However, the condition-responsive switch means 37 cannot restore the control system to a normal driving condition, and thus the emergency relay 41 will close, and bring about stopping of the vehicle if it is moving, and in any event will kill the engine. The driver should then relinquish control of the vehicle to another or obstain from driving. In the event that the driver is extremely intoxicated, so that he lacks the coordination to operate either of the switches 22 or 45, a warning of his condition will be given to others by the continuous blast of the horn and the blinking of the tail lights.

To energize the coil of the alcohol control relay 42, there is provided an alcohol sensing or breath analyzing means generally indicated at 85, the output of which energizes the coil of the alcohol control relay 42.

When the driver enters the car and turns on the ignition switch to start it, power is brought from the switch-operated power line 46, through the normally closed contacts 83 of the time delay switch 84, not only to the alcohol-control relay contacts 82, but also to the normally closed contacts 86 of a sampler solenoid relay 87, to a light source 88, and to a heater 89. A shift-lever switch 90 is closed whenever the driver places the shift lever in any drive position, and is connected to bring power from the switch-operated power line 46 to a heater 91 in the thermal time delay switch 84, which heater is grounded and to bring power to the coil of the sampler solenoid relay 87 which effects the taking of a breath sample. A capacitor 92 and a resistor 93 are connected to the coil of the sampler solenoid relay 87 and effect a delay in the movement of its armature when the coil thereof is energized, thereby delaying the opening of its normally closed contacts 86 for a predetermined number of moments, all in the manner previously described for the means 66, 67 associated with the emergency relay 41. The structural details of the alcohol sensing or breath analyzing means 85 and operation of the circuit can best be understood by reference to FIGURE 2.

In FIGURE 2 there is shown in greater detail the alcohol sensing or breath analyzing means 85 which appear within the dashed lines in FIGURE 1. The alcohol or breath analyzing means 85 includes an intake end 110 connected by a duct 111 to a cylinder 112 which communicates through a further duct 113 with the intake manifold of the engine. The intake end 110 is generally funnel-shaped and may comprise rubber or flexible plastic, and in a preferred embodiment, its entrant end 114 is generally kidney-shaped so that it may partially surround the hub of the steering wheel. The entrant end 114 is provided with a screen 115 to make it difficult for the driver to jam a cloth such as a handkerchief into the duct 111. If an attempt were made to cover the screen with a handkerchief to avoid having the breath of the driver enter the funnel, sufficient air will leak around and through the handkerchief to provide a normal test. The duct 111 is provided with a dust filter 116 to prevent unnecessary contamination of the device. The duct 111 is provided with a valve 117 and the duct 113 is provided with a valve 118. The valves 117, 118 normally block the ducts 111, 113. However, as stated above, when the ignition switch 22 is closed, power is brought through the normally closed contacts 86 of the sampler solenoid relay 87 to bring power to the coil of a sampler solenoid 119 which is provided with a plunger 120. The plunger 120 extends into the cylinder 112 and supports a piston 121 which has a seal fit with the interior of the cylinder 112. The piston further includes a check valve 122 of the flat type which opens in response to upward movement of the piston, and which seals in response to downward movement of the piston 121. To the upper end of the plunger 120, there is connected a cross-bar 123 which is spring biased in a downward direction by a pair of springs 124, and which are retained by a pair of guide pins 125 secured to a plate 126 carried by the housing of the solenoid 119, the guide pins 125 serving to guide the vertical movements of the cross-bar 123. The cross-bar 123 further supports a pair of connecting means 127 respectively connected to the valves 117, 118.

When the solenoid 119 is energized, the plunger moves upwardly, raising the piston 121 to a point where the duct 111 freely communicates with the duct 113. Upward movement of the plunger 120 also raises the cross-bar 123, and hence the valves 117 and 118, to align a port or opening 128, 129 respectively with the ducts 111 and 113.

Thus, as soon as the ignition switch 22 is closed, the duct 111 is opened to admit a breath sample to the cylinder 112, and the duct 113 is likewise opened to enable the vacuum or negative pressure from the engine intake manifold to draw such sample into the cylinder 112. As soon as the engine starts, the negative pressure is created in its intake manifold, and the exhaled breaths of the driver, or a repersentative sample thereof, are drawn therethrough.

This condition will continue indefinitely unless and until the driver places the shift lever into a drive position, thereby effecting closing of the shift-lever switch 90. As such, closing may occur immediately after the engine has started, and may also be delayed by the driver for any reason. To make certain that after the engine has started, a negative pressure has been built up in the intake manifold thereof and has drawn one or more exhaled breaths of the driver into the cylinder 112, the time delay means 92, 93 provide a few moments of delay during which the driver will exhale, before the contacts 86 of the sampler solenoid relay 87 actually open. Although the driver is now preparing to move the vehicle, the alcohol sensing or breath analyzing means 85 has been set into motion and may place the control system in an emergency condition. This is brought about as follows.

When the contacts 86 of the sampler solenoid relay 87 open, they deenergize the sampler solenoid 119, thereby permitting the plunger 120 to fall under the force of gravity, aided by the springs 124. Downward movement of the plunger 120 effects reclosing of the valves 117, 118, thereby trapping a breath sample in the cylinder 112, forcing a portion of it through a normally closed check valve 134, through a hose 135, through a glass bubbler 136 into a colored solution 137, bubbles of the breath sample thus passing upwardly through the solution 137, through a rubber stopper 138 having a vent 139, to the atmosphere.

The solution 137, described below, is preferably heated, which heat is provided by the heater 89 as soon as the ignition switch 22 is closed. The solution 137 is contained within a glass ampoule 145 which is transparent. Light from the bulb 88 can pass through the solution in the ampoule 145 to a varying degree, depending upon the color of the solution. The light that passes through is further restricted by an appropriate filter 146 and is collected on a photoelectric cell 147, which is connected by known means to operate the coil of the alcohol-control relay 42. Normally, the photoelectric cell 147 will conduct an amount of current which is insufficient to operate the alcohol-control relay 42. However, when an alcoholic breath has been bubbled through the solution, the alcohol therein reacts with the solution to cause its coloration to fade slightly, thereby enabling more light to pass therethrough, such light being of the frequency transmitted by the filter 146, to thereby increase the current conducted by the photoelectric cell 147 to a current level which energizes the coil of the alcohol-control relay 42. The light 88 is preferably supported in a movable manner to facilitate zeroing or initial setting, and may be repositioned to re-standardize the same if the solution 137 has been partially bleached by alcoholic breath. The ampoule 145 is normally supported in an opaque housing within which the light source 88 and photoelectric cell 147 are also disposed, such support being in a manner enabling replacement of one ampoule 145 with another one having a fresh quantity of solution therein.

It is thus evident that the alcohol-control relay 42 will close its contact 82 if an alcoholic breath has been sensed, and will remain open if no significant amount of alcohol is detected.

The original closing of the shift-lever switch 90 also energizes the heater 91 of the thermal time delay switch 84. The heater 91 gradually heats a heat-responsive element such as a bimetal, to ultimately open the normally closed contacts 83, cutting off power to the alcohol sensing or breath analyzing means 85. The thermal time delay switch 84 is adjustable and is set to cut off the power after an adequate time has been provided to insure that the test has been made. If no alcohol is detected, the sensing means 85 merely shuts down. However, the heater 91 remains energized so that if the driver should stall the engine, no re-sampling or retesting would take place owing to the open condition of the contacts 83. A retest will occur only if the shift lever has been in a non-drive position long enough to enable cooling of the thermal switch 84 and the reclosing of its contacts 83.

If the system detects alcohol and the car is stationary, the emergency control system nevertheless goes into its warning and emergency states successively. However, if the car is moving, regardless of speed, it is to be noted that the emergency relay 41 when thus energized will open the normally closed contacts 47 and prevent use of the condition-responsive switch means 37 as a means for restoring the control system to its normal state.

It is not necessary that the driver be intoxicaed to effect operation of the alcohol-control relay since the adjustments described enable the device to be so set that when the amount of alcohol in the blood exceeded a preset limit, the driver would be discouraged by the system from driving. The ampoule 145 preferably contains three milliliters of 0.025% potassium dichromate in 50% sulfuric acid. The solution absorbs the alcohol in the breath sample and reacts with or oxidizes it. The initial color of the solution is yellow, which color fades in proportion to the amount of alcohol oxidized. Thus, the extent that the solution 137 will fade is dependent upon the amount of alcohol in the breath sample. By adjustment of the light 88, the apparatus can be adjusted to be responsive to a predetermined amount of fading. The solution 137 is stable for at least a year if kept in darkness. It will be readily understood that other types of initial adjustment may be employed as an equivalent of light placement, for example, the provision of a balancing potential in the photoelectric circuit to maintain the current through the photoelectric cell at a level below that needed to pull in the alcohol-control relay 42.

The alcohol sensing or breath analyzing means 85 is not necessarily dependent upon the intoxication of the driver or on any change in his reflexes and movements. At the same time, the present system is responsive to intoxication of the driver as evidenced by an alcoholic breath and by his likelihood of release of the condition-responsive switch means 37. Strictly speaking, intoxication is brought about by the presence of alcohol in the blood which circulates to the brain. Such alcohol also reaches the lungs where it is exchanged with lung air and exhaled in the breath. The present device will detect alcohol on the breath even when there is substantially no alcohol in the blood. By way of example, assume that a sober driver's breath is sampled freshly after his having had an alcoholic drink. There will be sufficient fresh alcohol in his mouth to contaminate exhaled lung air, thus to provide a breath sample which is alcoholic. In like manner, the driver may have had a considerable amount of food prior to having an alcoholic drink, whereby the alcoholic drink remains in the stomach without being absorbed into the blood stream. Under these conditions alcohol vapors can pass upwardly through the oesophagus, such as by "burping," and give an extremly strong alcoholic indication even though, strictly speaking, the driver is not then under any influence of alcohol. The system is thus advantageous in that it can anticipate that the driver is about to come under the influence of alcohol, even though legally and medically he is not yet under the influence.

Although gate valves are shown in the schematic drawing of FIGURE 2, it should be understood that any other type of valve may be employed, such as a needle valve.

Various types of condition-responsive switch means 37 may be employed, a preferred type being a switch on the steering wheel of the vehicle, which switch is responsive to the driver's grip thereon.

Referring to FIGURES 3-16a, several forms of this type of switch are illustrated.

The first form in which the switches 43 may be embodied, is shown in FIGURES 3 and 4, and includes a snap switch 130 supported on a modified steering wheel 140a. The steering wheel 140a is of the usual circular shape and includes a rim 141a, a hub 142a, a number of spokes 143a extending radially from the hub 142a to the rim 141a, and a steering column 144a attached to the hub 142. The hub 142a has a number of apertures 131 each in line with one of the spokes 143a. Pivotally mounted within the apertures 131 are a number of levers 132, which support a concave hollow rim 133 which extends beneath the rim 141a along its entire lower circumference. Spring means normally mounted in the switch 130, bias the lever in a counterclockwise direction. One contact of the snap switch 130 is grounded, and the other side is connected to the relay contacts 47 as shown in FIGURE 1 by a wire which may be disposed along or within the steering column assembly. During normal operation of the vehicle, at least one hand of the driver should always grip the rim 141a and thereby close the snap switch 130 to keep the sensing-circuit relay 38 continually energized. Since more than one lever and switch is provided, the sensing-circuit relay will remain energized for a variety of different driver grips.

A second form of steering wheel is shown in FIGURES 5 and 6. In these and following figures, the steering wheel construction is denoted by numerals corresponding with those utilized in FIGURES 3 and 4, but with different suffix letters. The rim 151b has a groove 150 cut at its underside. Embedded at the top of this groove is a metallic strip 151 which extends circumferentially about the rim 141b and is connected to a wire (not shown) which may extend beneath or within the spokes 143b for connection to the relay contacts 47. A corresponding circular element 152 fits within the groove 150 and has mounted at its top a circumferential metal strip 153. The element 152 is supported on the hub 142b by a number of radial spring members 154 which extend to the hub 142b and which urge the element 152 to the position shown in FIGURE 5. A wire (not shown) also extends beneath one spring member 154 for connection within the circuit to the coil of the sensing-circuit relay 38. The metallic strips 151, 153 will be in contact in normal driving and will constitute the contacts 43 in FIGURE 1.

A third form is illustrated in FIGURES 7, 8, and 9. In this instance, a hollow flexible housing 160 surrounds a rim 141c and has circumferential metallic elements 161 and 162 embedded at opposite sides within the housing 160. These elements 161, 162 are spread apart by rubber inserts 163 which act both as springs and insulators. The elements 161 and 162 are connected by wire (not shown) which extend through the spoke 143c and the hub 142c to connect with the sensing-circuit relay 38. The driver's grip on the housing 160 effects contact between elements 161 and 162.

A fourth form is shown in FIGURES 10, 11, and 12. In this instance, a hollow housing 170 is supported upon the rim 141d and is filled with any suitable fluid, either liquid or gas. At one point adjacent to a spoke 143d, there is disposed a diaphragm 171 sealed within the housing 170. A snap switch 172 embedded in the rim 141d, is located directly in contact with the diaphragm 171 to be activated by it. The switch 172 is connected by suitable wiring (not shown) with the sensing-circuit relay 38. Gripping the rim 141d closes the switch 172 and thereby completes the circuit to such relay.

A still further form of the switch 37 is illustrated in FIGURES 13, 14, and 15. In this form, several snap switches 180 are embedded in the rim 181e adjacent to the spokes 143e and are wired into the coil circuit of the sensing relay 38 in parallel by means (not shown). A circumferential concave element 181 is located directly below the rim 141e and is supporter by radial spring elements 182 which lie beneath each spoke 143e and hold the element 181 in the normal position shown. Gripping the rim 141e will force the element 181 upward to close the coil circuit to the sensing relay 38.

A further and preferred form of grip responsive means 37 or wheel-gripping switch is shown in FIGURES 16 and 16a. In this form, the gripping surfaces of the steering wheel 141, such as the rim and/or spokes, are provided with a flexible tubular insulator 164, such as of rubber within which there is disposed an elongated flat contact strip 165 having a series of undulations 166 which extend transversely to the length of the contact strip 165. Also disposed within the flexible tubular insulator or housing 164 there is an elongated flexible contact 167, such as a wire, which extends in spaced adjacent relation to one side of the contact strip 165. The spaced relation is maintained by a number of spaced flexible rubber insulator spacers 168 through which the elongated flexible contact 167 extends. Several undulations appear between the spacers 168 and any time that the wheel is gripped, the flexible housing or tubular insulator 164 yields sufficiently to depress the flexible contact 167 into engagement with the undulations of the elongated flat contact strip 165. The various possible points of contact between the contact strip 165 and the flexible contact 167 are represented in FIGURE 1 by the contacts 43. A suitable lacing, steering wheel cover, cement or other bonding (not shown) is employed to hold the grip-responsive means of FIGURE 16 against the steering wheel 141.

Thus, the contact strip 165 and flexible contact 167 are enclosed and supported by the flexible tubular insulator 164. One of the contact strips 165 and flexible contact 167 is grounded and the other is connected into the coil circuit of the sensing-circuit relay 38.

In FIGURE 17, there is illustrated a brake pedal 148 pivotally mounted at 149 on a bulkhead 155. The brake pedal 148 is connected at 156 to operate the plunger 157 of a conventional master cylinder 158 connected by a line 159 to a conventional hydraulic brake system. The electric actuator or solenoid 75 for the brakes is also supported on the bulkhead 155 and includes a plunger 161 connected by a chain 173 to a yoke 174 slidably supported on the brake pedal lever 148, and adapted as by an adjusting screw 176 and a set screw 175 to be secured thereto in a select position.

In FIGURE 18, there is illustrated a speed-responsive switch 39 having leads connected thereto as shown in FIGURE 1. The vehicle includes a transmission 178 which drives a double-drive adapter 179, which in turn drives a cable 183 leading to the speed-responsive switch 39 and a second cable 184 which is the speedometer cable. A commercial example of the speed-responsive switch 39 is part No. 375,273 made by the Bendix Products Division of Bendix Aviation Corporation. A commercial embodiment of the double-drive adapter 179 is Model 669-C made by the Stewart Warner Corporation.

The optional mechanism for locking the steering control is shown in FIGURES 19 and 20 and includes the solenoid 80. The solenoid 80 operates a plunger 107 and is fixedly supported on a rigid part of the vehicle frame 95 by a flat bar 104. Pivoted to the frame 95 or to other stationary structure carried by the frame, and also pivoted to the plunger 107, is a lever 96 which terminates in a pawl 98 carried transversely on the distal end thereof. The frame 95 also supports a fixed stop 106 which limits downward movement of the lever 96. An axially movable link or bar 94, forming a part of the steering mechanism, such as a tie rod, has fixed upon it a strap 97 which includes a block or lock structure 99 and is secured on the link 94 by a bolt 100. The block structure has a notch 101 alignable with the pawl 98. If the link or bar 94 is substantially at the position that it has for straight vehicle movement, energization of the solenoid 80 brings the pawl 98 into locking engagement with the notch 101 to prevent turning of the steering system. If the notch 101 is slightly out of such position, the cam surfaces on the pawl 98 have a wedging action and tend to straighten or align the steering mechanism. In the event that the solenoid 80 is energized when the notch 101 is out of position by a substantial angle, the normal tendency of the wheels to straighten themselves due to the camber thereof, will cause the outer surface of the block 99 to act on the sloping surface of the pawl 98, thereby camming the lever 96 against the force of the solenoid 80 to a position where the notch 101 may receive the pawl 98, and be thereby locked. The solenoid 80 will be energized only when brakes are being applied and thus will limit vehicle movement to a fixed path. An unswerving prospective path is most easily analyzed by an outside observer, and the steering is maintained in a straight line during such time as the driver may be attempting to reach for and disengage momentarily the switch 45. At the same time, the sloping surfaces on the pawl 98 enable the steering lock structure to be overpowered by the driver if he considers it prudent to do so.

Typical values of capacitors 51, 66, and 92 for a 6-volt system are 500 mfd., while for a 12-volt system are 200 mfd. Typical values for the resistors 67, 93 for a 6-volt system are 270 ohms, and are 1100 ohms for a 12-volt system. The coils of relays 38, 41, and 87 have a typical resistance of 1000 ohms in a 6-volt system, and 2000 ohms in a 12-volt system.

It is pointed out that if anything should go wrong in the sensing circuit including the sensing means 37 and the sensing-circuit relay 38, there would be no adverse effect on the circuits under the control of the warning relay 40 or the emergency relay 41, nor on the normal vehicle circuits.

Although various minor modifications might be suggested by those versed in the art, it should be understood that I wish to embody within the scope of the patent warranted hereon all such embodiments as reasonably and properly come within the scope of my contribution to the art.

I claim as my invention:

1. An emergency control for a vehicle having a switch-operated power supply, and an electrically actuated remedying device, comprising:
    (a) switch means responsive to a proper driver condition;
    (b) normally closed contacts under the control of said switch means, and arranged to be open in response to said proper condition and to be closed in the absence of said condition;
    (c) means responsive to vehicle speed and having normally open contacts connected in series with said normally closed contacts, said speed-responsive means being operative to close said normally open contacts above a predetermined inching vehicle speed; and
    (d) means under the joint control of said contacts and operative when said contacts are closed to energize the electrically actuated remedying device;
   whereby said last named means may energize said electrically actuated remedying device solely at vehicle speeds above said predetermined inching speed below which no emergency control is needed.

2. An emergency control for a vehicle having a manual control, a switch-operated power supply, and an electrically actuated remedying device, comprising:
    (a) normally open switch means constructed to be carried on the manual control, to be continually closed in response to the operator's manual grip on the manual control, and to be opened instantly in response to the absence of such grip;
    (b) a relay having a coil connected in series with said switch means across said power supply, and in normal operation of the vehicle being continually energized through said switch means;
    (c) normally closed contacts responsive to said coil;
    (d) a capacitor connected to said coil and operative thereon to hold open said normally closed contacts for a few moments after current flow through said switch means has been terminated by the release of such grip, during which moments no emergency control is needed; and
    (e) means under the control of said contacts and operative when said contacts are closed to energize the electrically actuated remedying device;
   whereby the emergency control is rendered non-responsive to a rapid change of grip by an alert operator.

3. An emergency control for a vehicle having a switch-operated power supply, and an electrically actuated remedying device, comprising:
    (a) switch means responsive to a proper driver condition;
    (b) normally closed contacts under the control of said switch means, and arranged to be open in response to said proper condition and to be closed in the absence of said condition;

(c) means responsive to vehicle speed and having normally open contacts connected in series with said normally closed contacts, said speed-responsive means being operative to close said normally open contacts above a predetermined inching vehicle speed;

(d) a relay having normally open contacts respectively connected to said normally open speed responsive contacts; and (e) means under the joint control of said normally closed contacts and said speed responsive contacts, and operative when such contacts are closed to energize and coil of said relay and the electrically actuated remedying device;

whereby said contacts controlled by said speed-responsive means are shunted for any vehicle speed below said predetermined inching speed below which no emergency control is needed.

4. An emergency control for a vehicle having a switch-operated power supply, a brake pedal, an external brake light connected through a brake-pedal-operated switch to said power supply, and an electrically actuated remedying device, comprising:

(a) switch means responsive to a proper driver condition;

(b) normally closed contacts under the control of said switch means, and arranged to be open in response to said proper condition and to be closed in the absence of said condition;

(c) a first relay having a coil and having a pair of normally open contacts for being respectively connected to the power supply and to said brake light;

(d) an electric actuator constructed to be drivingly connected to the brake pedal;

(e) a second relay having a coil and having normally open contacts connected to close a circuit from the power supply to said electric actuator;

(f) means connected to the coil of said second relay to hold open the normally open contacts thereof for a predetermined period of delay after potential from the power supply has been applied to such coil; and (g) means under the control of said normally closed contacts, and operative when said normally closed contacts are closed, to energize the coils of said first and second relays and said electrically actuated remedying device, whereby said brake light is energized for a predetermined period of time before the brake pedal is actuated by said electric actuator.

5. An emergency control for a vehicle having a switch-operated power supply, a brake pedal, and an electrically actuated remedying device, comprising:

(a) switch means responsive to a proper drive condition, and arranged to be closed in response to said proper condition and to be opened in the absence of said condition;

(b) a first relay having a coil connected in series with said switch means across said power supply;

(c) normally closed contacts responsive to said coil;

(d) an electric actuator constructed to be drivingly connected to the brake pedal;

(e) a second relay having a coil and having a pair of normally open and a pair of normally closed contacts, said normally open contacts being connected to close a circuit from the power supply to said electric actuator, and said normally closed contacts of said second relay being connected in series with the coil of said first relay;

(f) means connected to the coil of said second relay to prevent reclosing of said first relay once said actuator has been energized to hold open the normally open contacts thereof for a predetermined period of delay after potential from the power supply has been applied to such coil; and (g) means under the control of said first named normally closed contacts, and operative when said first named normally closed contacts are closed, to energize the coil of said second relay and the electrically actuated remedying device, whereby said first relay will be non-responsive to any subsequent reclosing of said driver-condition-responsive switch means.

6. An emergency control for a vehicle having a switch-operated power supply, and a brake pedal, comprising:

(a) switch means responsive to a proper driver condition, and arranged to be closed in response to said proper condition and to be opened in the absence of said condition;

(b) a relay having a coil, connected to said power supply under the control of said switch means;

(c) an electric actuator under the control of said relay and constructed to be drivingly connected to the brake pedal;

(d) means connected to the coil of said relay and operative to delay energization of said actuator for a few moments after potential from the power supply has been applied to such coil during which moments no emergency control is needed; and (e) other means connected in circuit with said actuator and operative to disconnect said actuator from the power supply after electrical power has been applied thereto for an elapsed period of time sufficient to stop the vehicle, whereby the power supply is protected.

7. An emergency control for a vehicle having a switch-operated power supply, a brake pedal, and an electrically actuated remedying device, comprising:

(a) switch means responsive to a proper driver condition, and arranged to be closed in response to said proper condition and to be opened in the absence of said condition;

(b) a relay having a coil for being connected, in parallel with the electrically actuated remedying device, to said power supply, said relay and the electrically actuated remedying device being under the control of said switch means;

(c) an electric actuator under the control of said relay and constructed to be drivingly connected to the brake pedal;

(d) means connected to the coil of said relay and operative to delay energization of said actuator for a predetermined period of time after potential from the power supply has been applied to such coil; and (e) other means connected in circuit with said actuator and operative to disconnect said actuator from the power supply after electrical power has been applied to said actuator for an elapsed period of time; whereby power will be applied to the electrically actuated remedying device both before said brake actuator is energized and after said brake actuator is deenergized.

8. An emergency control for a vehicle having a switch-operated power supply, a brake pedal, and a steering control mechanism, comprising:

(a) switch means responsive to a proper driver condition, and arranged to be closed in response to said proper condition and to be opened in the absence of said condition;

(b) a first electric actuator constructed to be drivingly connected to the brake pedal;

(c) a second electric actuator having means for locking the steering control mechanism; and (d) a relay having a coil responsive to said switch means, and operative in response to opening of said switch means to connect said actuators to the power supply to effect vehicle braking in a predetermined path.

9. An emergency control for a vehicle having a switch-operated power supply, a shift lever for the transmission, and an electrically actuated remedying device, comprising:

(a) a relay having a coil;

(b) a switch under the control of the shift-lever position, said switch being closed whenever the lever is in a drive position, and open whenever the lever is in a non-drive position, one side of said switch being connected to the power supply;
(c) means operative to sample the driver's breath, under the control of said shift-lever switch;
(d) means responsive to any alcohol in such breath sample and operatively connected to the coil of said relay; and
(e) a pair of normally open contacts, closed by operation of said relay, for completing a circuit between the power supply and said electrically actuated remedying device of the vehicle.

10. An emergency control for a vehicle having a switch-operated power supply, a shift lever for the transmission, and an electrically actuated remedying device, comprising:
(a) a relay having a coil;
(b) a switch under the control of the shift-lever position, said switch being closed whenever the lever is in a drive position, and open whenever the lever is in a non-drive position, one side of said switch being connected to the power supply;
(c) means operative to sample the driver's breath, under the control of said shift-lever switch;
(d) a normally closed time delay switch;
(e) means connected to said power supply through said time delay switch, and responsive to any alcohol in such breath sample and operatively connected to the coil of said relay; and
(f) a pair of normally open contacts, closed by operation of said relay, for completing a circuit between the power supply and said electrically actuated remedying device of the vehicle.

11. An emergency control for a vehicle having a switch-operated power supply, a shift lever for the transmission, and an electrically actuated remedying device, comprising:
(a) a relay having a coil;
(b) a switch under the control of the shift-lever position, said switch being closed whenever the lever is in a drive position, and open whenever the lever is in a non-drive position, one side of said switch being connected to the power supply;
(c) means operative to sample the driver's breath, under the control of said shift-lever switch;
(d) means responsive to any alcohol in such breath sample and operatively connected to the coil of said first named relay;
(e) a second relay having a coil and a holding circuit, and controlling a pair of normally open contacts for connecting the power supply to said electrically actuated remedying device; and
(f) the first named relay having a pair of normally open contacts, closed by the operation of said first named relay, for connecting the power supply at least temporarily to the coil of said second relay;
whereby the electrically actuated remedying device of the vehicle is continually energized when an alcoholic breath has been sensed.

12. An emergency control for a vehicle having a switch-operated power supply, a shift lever for the transmission, and an electrically actuated remedying device, comprising:
(a) a relay having a coil and a pair of normally open contacts for completing a circuit between the power supply and said electrically actuated remedying device;
(b) a switch under the control of the shift-lever position, said switch being closed whenever the lever is in a drive position, and open whenever the lever is in a non-drive position, one side of said switch being connected to the power supply;
(c) a second relay having a coil connected through said shift-lever switch to the power supply, and having normally closed contacts;
(d) a solenoid connected through said normally closed contacts of said second relay to the power supply, and having means operative to admit a breath sample when said solenoid is energized, and to trap such sample when said solenoid is deenergized in response to closing of said shift-lever switch; and
(e) means responsive to any alcohol in such breath sample and operatively connected to the coil of said first named relay for energizing such coil.

13. An emergency control for a vehicle having a switch-operated power supply, a shift lever for the transmission, and an electrically actuated remedying device, comprising:
(a) a relay having a coil;
(b) a switch under the control of the shift-lever position, said switch being closed whenever the lever is in a drive position, and open whenever the lever is in a non-drive position, one side of said switch being connected to the power supply;
(c) means operative to sample the driver's breath, under the control of said shift-lever switch;
(d) a normally closed time delay switch having a heater circuit in series with said shift-lever switch;
(e) means connected to said power supply through said time delay switch, and responsive to any alcohol in such breath sample and operatively connected to the coil of said relay; and
(f) a pair of normally open contacts, closed by operation of said relay, for completing a circuit between the power supply and said electrically actuated remedying device of the vehicle.

14. An emergency control for a vehicle having a switch-operated power supply, a shift lever for the transmission, and an electrically actuated remedying device, comprising:
(a) a first relay having a coil and having normally open contacts;
(b) a switch under the control of the shift-lever position, said switch being closed whenever the lever is in a drive position, and open whenever the lever is in a non-drive position, one side of said switch being connected to the power supply;
(c) a second relay having a coil connected through said shift-lever switch to the power supply, and having normally closed contacts;
(d) a solenoid connected through said normally closed contacts of said second relay to the power supply, and having means operative to admit a breath sample when said solenoid is energized, and to trap such sample when said solenoid is deenergized in response to closing of said shift lever switch;
(e) a normally closed time delay switch having a heater circuit in series with said shift-lever switch, and having contacts for completing the circuit from the power supply to the solenoid, and to said normally open contacts of said first relay;
(f) a third relay having a coil and a holding circuit, and controlling a pair of normally open contacts for connecting the power supply to said electrically actuated remedying device, the coil of said third relay being connected to the power supply through said normally open contacts of said first relay; and
(g) means connected to said power supply through said contacts of said time delay switch, and responsive to any alcohol in such breath sample and operatively connected to the coil of said first relay.

15. An emergency control for a vehicle having a switch-operated power supply, a shift lever for the transmission, and an electrically actuated remedying device, comprising:
(a) a relay having a coil and a pair of normally open contacts for completing a circuit between the power supply and said electrically actuated remedying device;

(b) a switch under the control of the shift-lever position, said switch being closed whenever the lever is in a drive position, and open whenever the lever is in a non-drive position, one side of said switch being connected to the power supply;
(c) a second relay having a coil connected through said shift-lever switch to the power supply, and having normally closed contacts;
(d) means connected to the coil of said second relay to hold closed the normally closed contacts thereof for a predetermined period of delay after potential from the power supply has been applied to such coil;
(e) a solenoid connected through said normally closed contacts of said second relay to the power supply, and having means operative to admit a breath sample when said solenoid is enerized, and to trap such sample when said solenoid is deenergized in response to closing of said shift-lever switch; and
(f) means responsive to any alcohol in such breath sample and operatively connected to the coil of said first named relay for energizing such coil;
whereby the breath sample will be taken a predetermined interval after the shift lever has been placed in a drive position.

16. An emergency control for a vehicle having a switch-operated power supply, a manual control, a brake pedal, an external brake light connected through a pedal-operated switch to said power supply, and an electrically actuated remedying device, comprising:
(a) normally open switch means constructed to be carried on the manual control, to be continually closed in response to the operator's manual grip on the manual control, and to be opened instantly in response to the absence of such grip;
(b) a first relay having a coil connected in series with said switch means across said power supply, and in normal operation being continually energized thereby;
(c) normally closed contacts responsive to said coil;
(d) means connected to said coil and operative thereon to hold open said normally closed contacts for a few moments after potential from the power supply has been removed from said coil by the release of such grip during which moments no emergency control is needed, whereby the emergency control is rendered non-responsive to a rapid change of grip by an alert operator;
(e) means responsive to vehicle speed and having normally open contacts connected in series with said normally closed contacts, said speed-responsive means being operative to close said normally open contacts above a predetermined inching vehicle speed;
(f) a second relay having a coil and at least two pair of normally open contacts, the contacts of one pair being arranged to be respectively connected to the power supply and to said brake light, and the contacts of the other pair being respectively connected to said normally open contacts of said speed-responsive means;
(g) an electric actuator constructed to be drivingly connected to the brake pedal;
(h) a third relay having a coil and having normally open contacts connected to close a circuit from the power supply to said electric actuator;
(i) means connected to the coil of said third relay to hold open the normally open contacts thereof for a predetermined period of delay after potential from the power supply has been applied to such coil;
(j) means under the joint control of said normally closed contacts and said contacts of said speed-responsive means, and operative when such contacts are closed to energize the coils of said second and third relays and said electrically actuated remedying device; and
(k) other means connected in circuit with said actuator and operative to disconnect said actuator from the power supply after electrical power has been applied thereto for an elapsed period of time.

17. An emergency control for a vehicle having a switch-operated power supply, and an electrically actuated remedying device, comprising:
(a) switch means responsive to a power driver condition;
(b) normally closed contacts and normally open contacts arranged to be substantially simultaneously controlled by said switch means;
(c) means under the control of said normally closed contacts to energize the electrical actuated remedying device, in the absence of said condition;
(d) electrical signalling means disposed to be seen from other vehicles; and
(e) means under the control of said normally open contacts and operative to energize continually said signalling means during existence of said proper driver condition.

References Cited by the Examiner
UNITED STATES PATENTS

| | | | |
|---|---|---|---|
| 1,974,922 | 9/34 | La Croix. | |
| 2,025,980 | 12/35 | Getty | 200—61.57 |
| 2,126,878 | 8/38 | Galli | 180—82 |
| 2,172,116 | 9/39 | Warren | 180—82 |
| 2,192,021 | 2/40 | Weeks | 180—82 |
| 2,625,594 | 1/53 | Mathis | 180—82 |
| 2,934,159 | 4/60 | Butler | 180—82 |
| 2,945,099 | 7/60 | Mayhew | 200—61.57 |
| 2,991,839 | 7/61 | De Remer | 180—82 |
| 3,051,258 | 8/62 | Byers | 180—82 |

FOREIGN PATENTS

| | | |
|---|---|---|
| 528,225 | 6/31 | Germany. |
| 836,749 | 4/52 | Germany. |
| 907,981 | 1/55 | Germany. |
| 559,226 | 3/57 | Italy. |

A. HARRY LEVY, *Primary Examiner.*